United States Patent
Shibata

(10) Patent No.: US 11,842,111 B2
(45) Date of Patent: Dec. 12, 2023

(54) IMAGE FORMING APPARATUS THAT TRANSMITS PAPER ATTRIBUTE INFORMATION FOR AGGREGATION OF VARIOUS TYPES OF INFORMATION, METHOD FOR CONTROLLING IMAGE FORMING APPARATUS, AND STORAGE MEDIUM

(71) Applicant: CANON KABUSHIKI KAISHA, Tokyo (JP)

(72) Inventor: Daisuke Shibata, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/730,431

(22) Filed: Apr. 27, 2022

(65) Prior Publication Data
US 2022/0382500 A1   Dec. 1, 2022

(30) Foreign Application Priority Data
May 28, 2021   (JP) ................................ 2021-090243

(51) Int. Cl.
*G06F 3/12*   (2006.01)
(52) U.S. Cl.
CPC .......... *G06F 3/1258* (2013.01); *G06F 3/1205* (2013.01)
(58) Field of Classification Search
CPC .... G06F 3/1258; G06F 3/1205; G06F 3/1255; G06F 3/1208; G06F 3/1235; G06F 3/1252; G06F 3/121; G06F 3/1253; G06F 3/1273; G06F 3/1207; G06F 3/1288; G06K 15/1809; G06K 15/1823; G06K 15/186; G06K 15/4065; H04N 1/2323; G03G 15/5029; G03G 15/6508
See application file for complete search history.

(56) References Cited

U.S. PATENT DOCUMENTS

| | | | |
|---|---|---|---|
| 9,349,078 B2 | 5/2016 | Kujirai | |
| 2015/0281475 A1* | 10/2015 | Nagasaki | G06F 3/1287 358/1.13 |
| 2022/0147285 A1* | 5/2022 | Chiba | G06F 3/1273 |

FOREIGN PATENT DOCUMENTS

JP    2015148847 A    8/2015

* cited by examiner

*Primary Examiner* — Iriana Cruz
(74) *Attorney, Agent, or Firm* — ROSSI, KIMMS & McDOWELL LLP

(57) ABSTRACT

An image forming apparatus capable of transmitting paper attribute information set during job interruption. The image forming apparatus, which has an image forming device and a paper feeding part storing paper and is communicable with a management server, holds paper attribute information in association with the paper feeding part, executes an image forming job that causes the image forming device to perform a series of image forming using the paper stored in the paper feeding part, generates an execution log of the image forming job based on the attribute information, and when the attribute information corresponding to the paper feeding part is changed during the execution of the image forming job, generates an execution log including the attribute information before/after the change and transmits the generated execution log to the management server.

10 Claims, 17 Drawing Sheets

FIG. 5

| 501 | 502 | 503 | 504 | 505 | 506 | 507 |
|---|---|---|---|---|---|---|
| PAPER GRADE ID | PAPER NAME | TYPE | BASIS WEIGHT (g/m2) | SURFACE TYPE | COLOR | CHARACTERISTICS |
| 00000100 | PLAIN PAPER1 | BASIC SETTING | 70g/m2 | HIGH-QUALITY PAPER | WHITE | NONE |
| 00000101 | THICK PAPER | BASIC SETTING | 120g/m2 | HIGH-QUALITY PAPER | WHITE | NONE |
| 00000103 | COLOR PAPER | BASIC SETTING | 75g/m2 | HIGH-QUALITY PAPER | BLUE | NONE |
| 00000104 | ENVELOPE | BASIC SETTING | 90g/m2 | HIGH-QUALITY PAPER | WHITE | ENVELOPE |
| 00010101 | PLAIN PAPER 2 | USER SETTING | 80g/m2 | HIGH-QUALITY PAPER | WHITE | NONE |
| 00010102 | RECYCLED PAPER (PUNCHED) | USER SETTING | 70g/m2 | RECYCLED PAPER | WHITE | PUNCHED |
| 00010103 | COLOR PAPER (GREEN) | USER SETTING | 75g/m2 | HIGH-QUALITY PAPER | GREEN | NONE |

| BASIC INFORMATION | JOB IDENTIFICATION NUMBER |
| --- | --- |
| | USER NAME |
| | PRINT START DATE AND TIME |
| | PRINT END DATE AND TIME |
| PRINT SETTING INFORMATION | COLOR MODE |
| | PAGE LAYOUT |
| | SINGLE SIDED/DOUBLE SIDED |
| | NUMBER OF COPIES |
| OUTPUT INFORMATION | TOTAL NUMBER OF OUTPUT PAGES/SHEETS |
| | NUMBER OF COLOR SIDES/SHEETS (FOR EACH PAPER TYPE) |
| | NUMBER OF MONOCHROME SIDES/SHEETS (FOR EACH PAPER TYPE) |

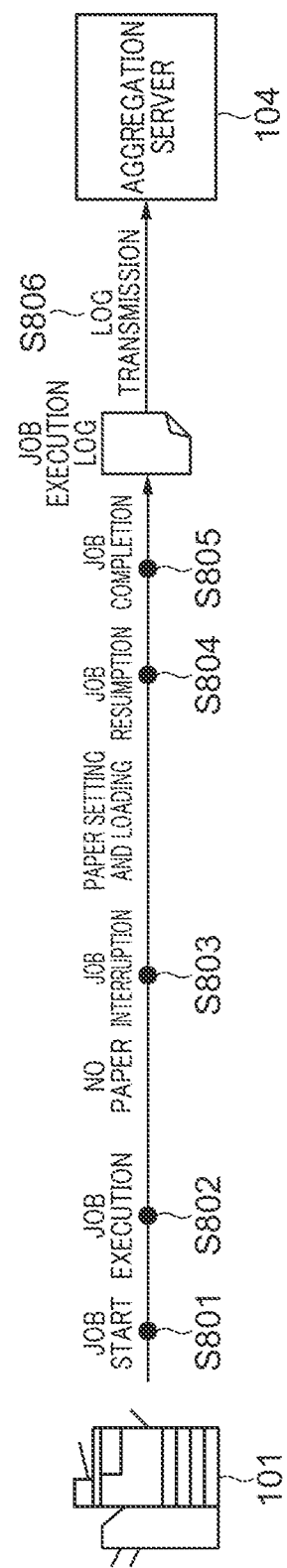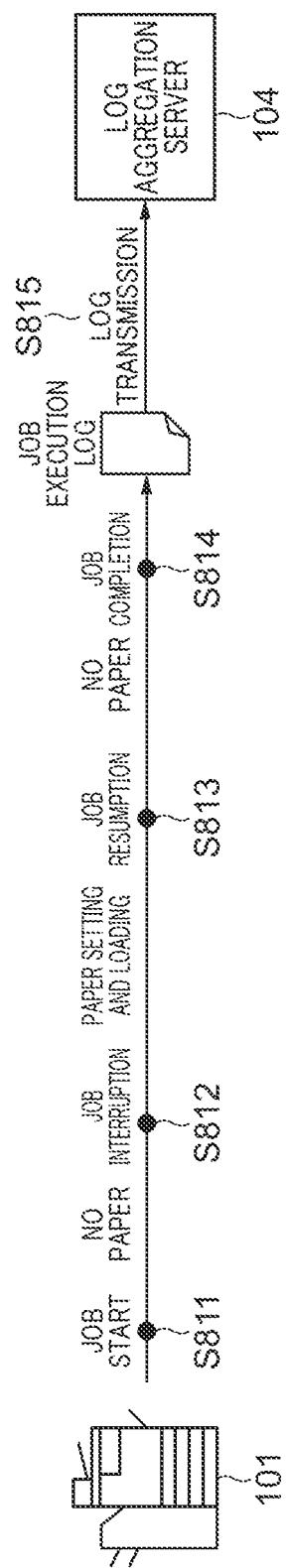

{
  "event": {
    "serialNo": "ZZZ99999",
    "name": "JobCompleted",
    "completeState": "Success",
    "documents": [{
      "type": "Job",
      "attribute": {
        "jobNumber": 66,                          ⎫
        "userName": "USER1",                      ⎬ 1101
        "jobEndTime": "20201105T185807",          ⎭
        "setting": {
          "colorMode": "Color",                   ⎫
          "pageLayout": "Simple1Up",              ⎬ 1102
          "sided": "2to2-Sided",                  ⎪
          "copies": "1"                           ⎭
        },
        "countertotal": {
          "paper": 3,
          "page": 6
        },
        "outputPaper": [
          {
            "medidID": "00010101",                ⎫
            "size": "A4"                          ⎬ 1103
            "color": "Color",                     ⎪
            "count": "3"                          ⎭
          }
        ]
      }
    },
    {
      "type": "Media",
      "attribute": {
        "paper": {
          "size": {
            "id": "A4",
            "width": 2100,
            "height": 2970
          },
          "type": {
            "mediaId": "00010101",
            "name": "PLAIN PAPER 2",              ⎫
            "category": "CustomType"              ⎬ 1104
          },                                       ⎪
          "color": "White",                        ⎪
          "weight": 80,                            ⎪
          "finish": "Uncoated",                    ⎪
          "shape": "Normal",                       ⎪
          "orientation": "ShortEdgeFeed"           ⎭
        },
        "count": 3
      }
    }
    ]
  }
}
```

FIG. 14

| PAPER FEED UNIT | PAPER SIZE | PAPER NAME | PAPER GRADE ID |
|---|---|---|---|
| PAPER FEED STAGE 1 | A4 | PLAIN PAPER 1 | 00000100 |
| PAPER FEED STAGE 2 | A4 | PLAIN PAPER 2 | 00010101 |
| PAPER FEED STAGE 3 | A4 | COLOR PAPER (GREEN) | 00010103 |
| PAPER FEED STAGE 4 | A3 | PLAIN PAPER 1 | 00000100 |
| MANUAL FEED TRAY | B4 | THICK PAPER | 00000101 |
| PAPER FEED STAGE 2 | B4 | COLOR PAPER | 00000103 |

IMAGE FORMING APPARATUS THAT TRANSMITS PAPER ATTRIBUTE INFORMATION FOR AGGREGATION OF VARIOUS TYPES OF INFORMATION, METHOD FOR CONTROLLING IMAGE FORMING APPARATUS, AND STORAGE MEDIUM

BACKGROUND OF THE INVENTION

Field of the Invention

The present invention relates to an image forming apparatus, a control method for the image forming apparatus, and a storage medium, and particularly to an image forming apparatus that transmits paper attribute information for aggregation of various types of information, a control method for the image forming apparatus, and a storage medium.

Description of the Related Art

There are known systems that aggregate and analyze the usage status of printers, multifunction machines, and other image forming apparatuses. The system collects, from the image forming apparatus, for example, job histories that record the results of print jobs executed by the image forming apparatus, as well as paper information about the paper which is supplied from the paper feed unit of the image forming apparatus and on which images are formed. Paper information is, for example, information indicating paper size (for example, A4 and A3) and paper type (for example, plain paper and thick paper). Based on the collected job history and paper information, the system can aggregate the number of printed sides and printed sheets by, for example, paper size or paper type.

There are a wide variety of paper types handled by the image forming apparatus, and adjustments must be made according to the printing characteristics of each paper type in order to achieve optimal image formation. For example, even for paper that has been treated as a "plain paper" type, since paper basis weight, surface type, and other properties vary depending on the paper grade, it is necessary to make adjustments according to printing characteristics using parameters more detailed than the paper type. Recent image forming apparatuses hold the parameters necessary for adjusting printing characteristics for each paper information, and when printing, they are capable of reading out the parameters corresponding to the specified paper information and printing with optimal printing characteristics.

The paper information specified at the time of printing can be specified from the operation unit of the image forming apparatus. It is also possible for the user to register the paper information while adding a paper name thereon in the image forming apparatus so that the user can easily specify the paper type to be used for printing. Under such circumstances, there is a growing demand not only for aggregation by paper type, but also by paper grade used for printing. Japanese Laid-Open Patent Publication (kokai) No. 2015-148847 discloses a system that manages job execution results for each paper type by collecting paper grade information and job history corresponding to the paper information from the image forming apparatus when the paper information is registered. However, the technology in Japanese Laid-Open Patent Publication (kokai) No. 2015-148847 does not collect job history information or paper grade information until the user registers the paper information. In order to address this issue, for example, the image forming apparatus may acquire paper attribute information including paper size, paper type, and paper grade information at the start of a job for aggregation, and transmit the paper attribute information and job history at the completion of a job.

However, in a case where the timing for acquiring paper attribute information is at the start of a job, as described above, the intended paper attribute information may not be transmitted from the image forming apparatus. For example, when the paper of the type specified by the user is not loaded in the paper feed unit of the image forming apparatus when the print job is started, the print job is interrupted in the image forming apparatus, and the print job is resumed after the paper is loaded in the paper feed unit and the paper attribute information for that paper is set. In a case where the paper attribute information is set during the interruption of a print job, as described above, when the timing for acquiring the paper attribute information is at the start of the job, the image forming apparatus cannot acquire the paper attribute information of the paper used for printing and cannot transmit the intended paper attribute information. As a result, the above system cannot accurately manage the results of job execution for each paper type.

SUMMARY OF THE INVENTION

The present invention provides an image forming apparatus capable of transmitting paper attribute information set during job interruption, a control method for the image forming apparatus, and a storage medium.

Accordingly, the present invention provides an image forming apparatus capable of communicating with a management server, comprising an image forming device configured to form an image on paper, a paper feeding part configured to store paper to be supplied to the image forming device, and one or more controllers configured to function as a unit configured to hold paper attribute information in association with the paper feeding part, a unit configured to execute an image forming job that causes the image forming device to perform a series of image forming using the paper stored in the paper feeding part, a unit configured to acquire the attribute information, a unit configured to generate an execution log of the image forming job based on the attribute information, and a unit configured to transmit the generated execution log to the management server, wherein when the attribute information corresponding to the paper feeding part is changed during the execution of the image forming job, the units generate an execution log including the attribute information before the change and the attribute information after the change, and transmit the generated execution log to the management server.

According to the present invention, paper attribute information set during job interruption can be transmitted.

Further features of the present invention will become apparent from the following description of exemplary embodiments (with reference to the attached drawings).

BRIEF DESCRIPTION OF THE DRAWINGS

FIG. 5 is a diagram showing an example of a paper grade table managed by the paper grade information management unit in FIG. 3.

FIG. 6 is a diagram showing an example of job history information managed by the job history management unit in FIG. 3.

FIGS. 8A and 8B are diagrams showing the flow of the processing by which the image forming apparatus of FIG. 1 resumes a job that was once interrupted and transmits a job execution log to the aggregation server.

FIG. 11 is a diagram showing an example of a job execution log generated by the transmission data generation unit in FIG. 3.

FIG. 14 is a diagram showing an example of a record of the paper information list of the paper feed unit in the present embodiment.

DESCRIPTION OF THE EMBODIMENTS

The present invention will now be described in detail below with reference to the accompanying drawings showing embodiments thereof. It should be noted that not all of the combinations of features described in the embodiment may be essential to the solution of the invention.

Figure 1:
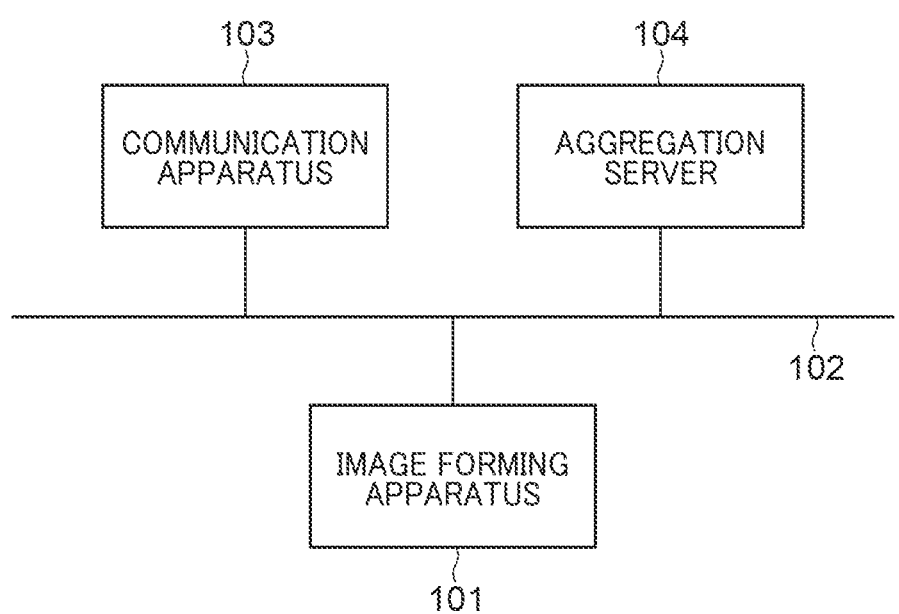
FIG. 1 is a block diagram schematically showing the network configuration of an image forming apparatus according to an embodiment of the present invention.

FIG. 1 is a block diagram schematically showing the network configuration of an image forming apparatus 101 according to an embodiment of the present invention. In FIG. 1, an image forming apparatus 101 is connected with a communication apparatus 103 and an aggregation server 104 via a network 102 communicably.

The image forming apparatus 101 prints on paper based on print data received via the network 102. This printing uses known printing technologies such as electrophotographic and inkjet technologies. The image forming apparatus 101 scans a document with a scanner 209 in FIG. 2 described below to generate image data for that document, and prints this image data. Alternatively, the image forming apparatus 101 transmits the generated image data by Email or other means. Furthermore, the image forming apparatus 101 transmits the job history information, in which the job execution results are recorded, to the aggregation server 104. It should be noted that, in the present embodiment, the image forming apparatus 101 may be configured with only a printer function without a scanner function. The communication apparatus 103 is, for example, a personal computer (PC). The communication apparatus 103 generates print data according to instructions received from a user and transmits the print data to the image forming apparatus 101. The aggregation server 104 acquires job history information from the image forming apparatus 101 and executes aggregation of the usage status of the image forming apparatus 101 based on the acquired job history information.

Figure 2:
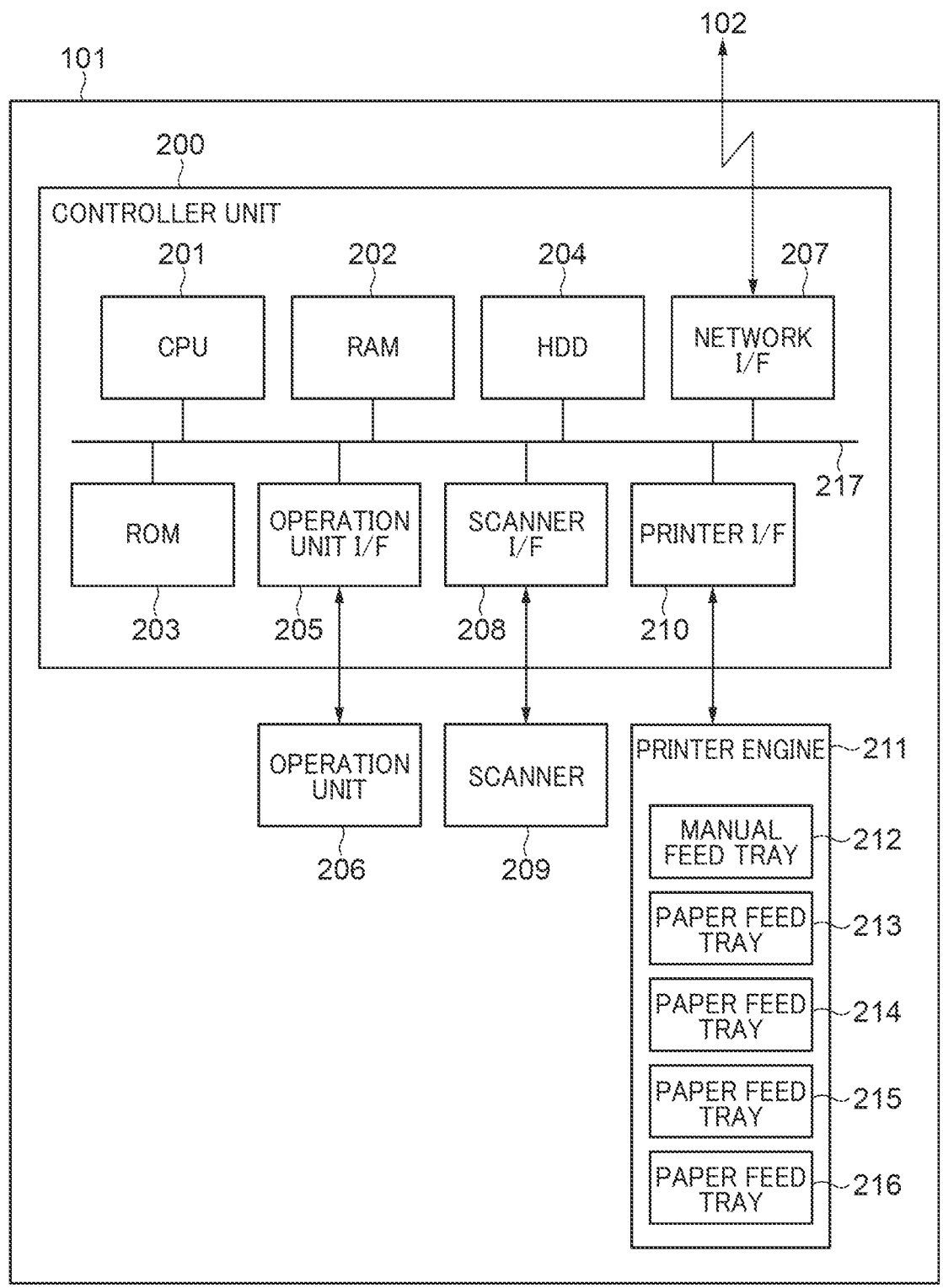
FIG. 2 is a block diagram schematically showing the hardware configuration of the image forming apparatus shown in FIG. 1.

FIG. 2 is a block diagram schematically showing the hardware configuration of the image forming apparatus 101 shown in FIG. 1. In FIG. 2, the image forming apparatus 101 includes a controller unit 200, an operation unit 206, a scanner 209, and a printer engine 211. The controller unit 200 is connected to the operation unit 206, scanner 209, and printer engine 211. The controller unit 200 also includes a CPU 201, a RAM 202, a ROM 203, an HDD 204, an operation unit I/F 205, a network I/F 207, a scanner I/F 208, and a printer I/F 210. The CPU 201, RAM 202, ROM 203, HDD 204, operation unit I/F 205, network I/F 207, scanner I/F 208, and printer I/F 210 are connected to one another via a system bus 217.

The CPU 201 executes various controls based on control programs, etc. stored in the ROM 203 and HDD 204. For example, the CPU 201 outputs image signals as output information to the printer engine 211, which is connected via the printer I/F 210. The RAM 202 functions as the main memory or work area, or the like for the CPU 201. For example, the RAM 202 is used as an area for developing output information, an area for storing environmental data, or NVRAM. The ROM 203 stores programs and other data to be executed by the CPU 201. For example, the ROM 203 stores programs for executing each processing by a software module 300 in FIG. 3, described below. The HDD 204 stores font data, emulation programs, form data, and other data.

The operation unit I/F 205 is an interface (I/F) between the operation unit 206, which includes a display unit of touch panel type, and the controller unit 200. For example, the operation unit I/F 205 outputs screen data to be displayed on the display unit of the operation unit 206, to the operation unit 206. In addition, the operation unit I/F 205 acquires information entered by the user into the operation unit 206 from the operation unit 206 and transfers the acquired information to the CPU 201. The network I/F 207 is an interface for the image forming apparatus 101 to communicate with the communication apparatus 103 and the aggregation server 104 on the network 102. For example, the network I/F 207 receives print data, instructions to change various settings, and the like from the communication apparatus 103.

The scanner I/F 208 controls the scanner 209 to scan a document. The printer I/F 210 outputs image signals transmitted from the CPU 201, to the printer engine 211. The printer engine 211 includes a plurality of paper feed units, such as a manual feed tray 212 and four paper feed trays 213 to 216. The printer engine 211 prints images on paper supplied from the paper feed unit specified by the user, based on image signals received from the printer I/F 210.

Figure 3:
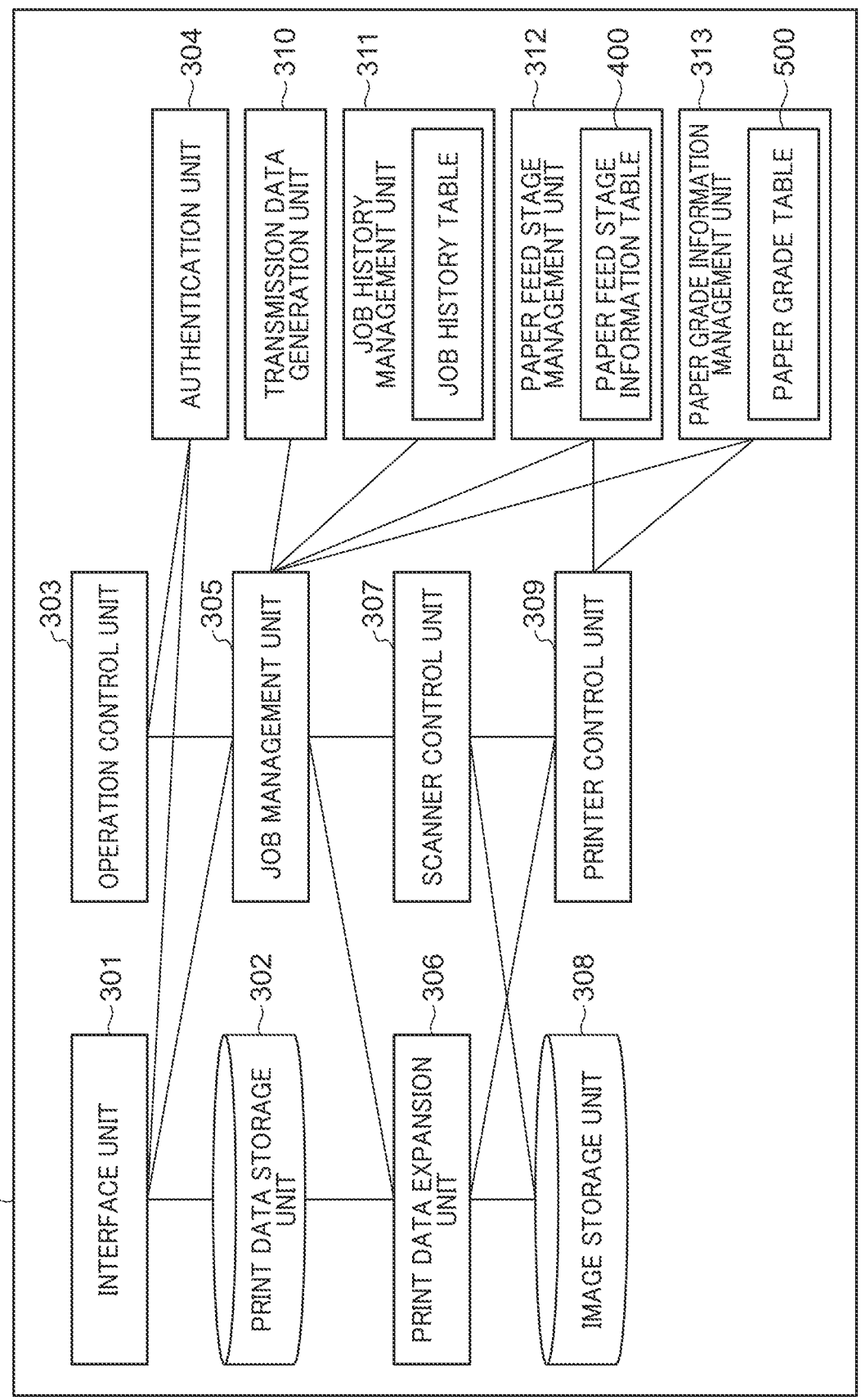
FIG. 3 is a block diagram schematically showing the configuration of a software module of the image forming apparatus shown in FIG. 1.

FIG. 3 is a block diagram schematically showing the configuration of a software module 300 of the image forming apparatus 101 shown in FIG. 1. In FIG. 3, the software module 300 has an interface unit 301, a print data storage unit 302, an operation control unit 303, an authentication unit 304, a job management unit 305, a print data expansion unit 306, a scanner control unit 307, an image storage unit 308, a printer control unit 309, a transmission data generation unit 310, a job history management unit 311, a paper feed stage management unit 312, and a paper grade information management unit 313. Processing by the software module 300 is achieved by the CPU 201 executing a program stored in the ROM 203 and others.

The interface unit 301 is a module that allows the image forming apparatus 101 to communicate with external apparatuses. The image forming apparatus 101 receives print data from the communication apparatus 103 on the network 102 by the interface unit 301, and also transmits history information on print jobs executed using the print data and the paper information described below, to the aggregation server 104. The print data storage unit 302 temporarily stores print data in the RAM 202 or HDD 204.

The operation control unit 303 controls the operation unit 206 to accept user login requests to the image forming apparatus 101, copy instructions, scan transmission instructions, and others. For example, the operation control unit 303 displays a login form (not shown) on the operation unit 206 to accept user login requests. Upon receiving a user login request, the operation control unit 303 outputs the authentication information, such as user name and password entered in the login form, to the authentication unit 304, and makes an authentication request to the authentication unit 304. When the authentication by the authentication unit 304 is successful, the operation control unit 303 receives the authentication ID from the authentication unit 304. Thereafter, the operation control unit 303 holds the user name and authentication ID of the user logged into the image forming apparatus 101 until a logout request is received. When the user operation instructs job issuance, such as copying, the operation control unit 303 outputs the held user name and authentication ID along with the job issuance request, to the job management unit 305.

The operation control unit 303 executes the logout processing when a logout operation is executed by the user at the operation unit 206. In addition, in the operation control unit 303, a timeout period is preset, whereby when the operation unit 206 does not accept any user operation before the timeout period elapses, the operation control unit 303 executes the logout processing. The user can refer to the preset timeout time from the operation unit 206. The user can also refer to the timeout time from external apparatus such as the communication apparatus 103 or aggregation server 104. In the logout processing, the operation control unit 303 notifies the authentication unit 304 of the logout along with the user name, authentication ID, and logout factor information, and discards the authentication information and authentication ID.

The authentication unit 304 is a module that executes authentication processing and maintains an authentication information table. The authentication unit 304 acquires the authentication information entered by the user in the login form displayed on the operation unit 206 from the operation control unit 303. The authentication unit 304 executes authentication processing by comparing the acquired authentication information with the user name and password registered in the authentication information table. In the present embodiment, the authentication unit 304 is configured to hold an authentication information table. However, the authentication unit 304 is not limited to this configuration, and may acquire an authentication information table from an authentication server (not shown) or other source, and perform authentication processing using this authentication information table. Upon successful authentication, the authentication unit 304 issues an authentication ID and outputs the authentication ID to the operation control unit 303 along with the success or failure of authentication.

The job management unit 305 manages information about jobs executed by the image forming apparatus 101 (hereinafter referred to as "job information"). The job information includes the start time of the job, the user name of the user who gave the job execution instruction, and output attribute information. The output attribute information includes the number of copies printed, information indicating whether printing is monochrome or color, paper type, paper grade, and the like. For example, when the user operates the operation unit 206 and gives an instruction to execute a job, the job management unit 305 acquires the output attribute information and user name from the operation control unit 303.

The print data expansion unit 306, based on job information managed by the job management unit 305, acquires print data stored in the RAM 202 or HDD 204, and executes image formation processing based on the acquired print data to generate image data. The scanner control unit 307 causes the scanner 209 to scan a document and generate image data of the document. The image storage unit 308 temporarily stores image data generated by the print data expansion unit 306 and scanner control unit 307 in the RAM 202 or HDD 204. The printer control unit 309 causes the printer engine 211 to print the image data stored in the image storage unit 308.

The transmission data generation unit 310 collects information to generate the job execution log described below to be transmitted to the aggregation server 104. For example, the transmission data generation unit 310 collects job history information from the job history management unit 311, and paper information on the paper stored in the paper feed unit used in the job from the paper feed stage management unit 312 and paper grade information management unit 313. The paper information includes paper name, paper size, and paper grade ID. The transmission data generation unit 310 converts these collected information into a format to be output to the aggregation server 104 and stores it in the RAM 202 or HDD 204. The job history management unit 311 manages the history information of jobs executed by the image forming apparatus 101. When the image forming apparatus 101 completes a job, the job history management unit 311 acquires the job information for this job from the job management unit 305 and records the acquired job information in a job history table as job history information.

Figure 4:
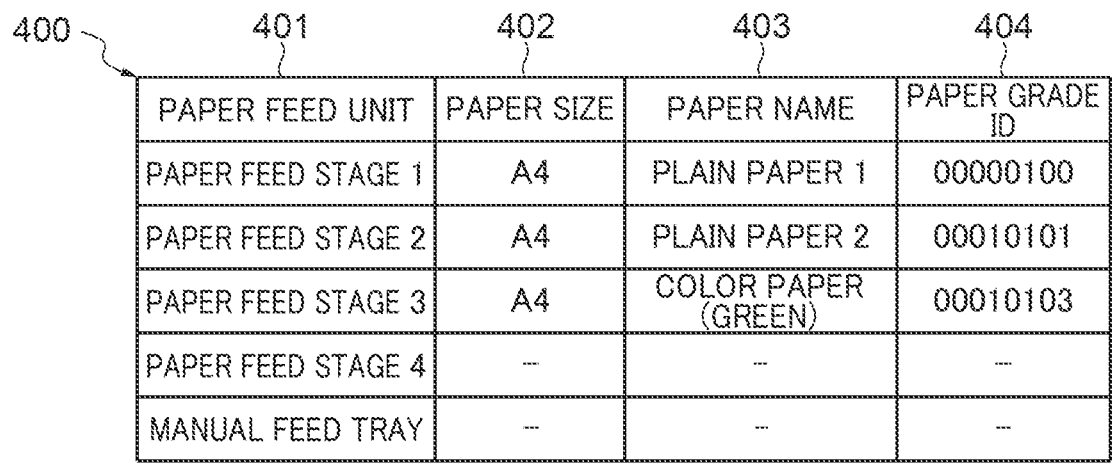
FIG. 4 is a diagram showing an example of a paper feed stage information table managed by the paper feed stage management unit in FIG. 3.

The paper feed stage management unit 312 records and manages paper information in a paper feed stage information table 400 (FIG. 4). The paper feed stage management unit 312 updates the paper feed stage information table 400, described below, based on the paper information entered by the user on the operation unit 206 or the paper information detected by the sensor of the printer engine 211 when the user loads paper in the paper feed unit.

The paper grade information management unit 313 functions as a database that manages paper grade information, which is detailed information about the paper used for printing. The paper grade information management unit 313 registers the paper grade information entered by the user into the operation unit 206, to a paper grade table 500 (FIG. 5) according to the registration instruction by the user. In the paper grade table 500, paper names are managed in association with paper grade IDs. The paper grade information management unit 313 can also update the paper grade table 500 according to registration instructions received from the communication apparatus 103.

FIG. 4 is a diagram showing an example of the paper feed stage information table 400 managed by the paper feed stage management unit 312 in FIG. 3. The paper feed stage information table 400 includes a paper feed unit 401, a paper size 402, a paper name 403, and a paper grade ID 404. The paper feed stage information table 400 records the paper information set in the paper feed unit included in the image forming apparatus 101. It should be noted that the configuration of the paper feed stage information table 400 is not limited to that shown in FIG. 4. For example, the paper feed stage information table 400 may include other items.

The paper feed unit 401 records the name of the paper feed unit included in the image forming apparatus 101. In FIG. 4, as an example, "paper feed stage 1" indicating the paper feed tray 213, "paper feed stage 2" indicating the paper feed tray 214, "paper feed stage 3" indicating the paper feed tray 215, "paper feed stage 4" indicating the paper feed tray 216, and "manual feed tray" indicating the manual feed tray 212 are set. The paper size 402 records the paper size of the paper stored in the paper feed unit. The paper size 402 records the paper size detected by the sensor of the printer engine 211 when the user loads the paper into the paper feed unit, or the paper size entered by the user into the operation unit 206. The paper name 403 records the name of the paper stored in the paper feed unit. The paper grade ID 404 records the identification number to identify the paper grade information of the paper stored in the paper feed unit from the paper grade table 500 in FIG. 5. Each value recorded in the paper name 403 and paper grade ID 404 is determined based on the paper grade information set in the paper setting screen 700 in FIG. 7A, described below.

FIG. 5 is a diagram showing an example of the paper grade table 500 managed by the paper grade information management unit 313 in FIG. 3. The paper grade table 500 registers paper grade information including a plurality of paper parameters required to execute a print job. The paper grade information includes, for example, information on paper name, paper type, paper basis weight, paper surface type, paper color, and paper characteristics. The paper grade table 500 registers paper grade information for a plurality of types of paper. The paper grade table 500 includes a paper grade ID 501, a paper name 502, type 503, a basis weight 504, surface type 505, a color 506, and characteristics 507. It should be noted that the configuration of the paper grade table 500 is not limited to that shown in FIG. 5; for example, the paper grade table 500 may include other items.

The paper grade ID 501 is an identifier to identify the paper grade information registered in the paper grade table 500. In the paper name 502, the name of the paper included in the registered paper grade information is set. In the type 503, either "basic setting," which indicates that the paper grade information is held in advance by the image forming apparatus 101, or "user setting," which indicates that the paper grade information is set arbitrarily by the user is set. The basis weight 504 is set to the basis weight included in the registered paper grade information. In the surface type 505, information on the surface type included in the registered paper grade information is set. In the color 506, the color of the paper included in the registered paper grade information is set. In the characteristics 507, information on the characteristics of the paper included in the registered paper grade information is set.

FIG. 6 is a diagram showing an example of job history information managed by the job history management unit 311 in FIG. 3. As shown in FIG. 6, job history information includes basic information, print setting information, and output information. One job history information is generated for each job. In the present embodiment, job history information is held in the job history information table in the job history management unit 311 for each job identification number using the job identification number as a key.

The basic information includes, for example, a job identification number, user name, document name, print start date and time, and print end date and time. It should be noted that the configuration of the basic information is not limited to this configuration. The job identification numbers are continuous values issued uniquely within the image forming apparatus 101, and the aggregation server 104 uses this value to manage history information on jobs in the image forming apparatus 101. The print setting information is transmitted from the job management unit 305 along with the basic information when the print job is executed. The output information includes the total number of pages printed, the total number of output pages, the numbers of sides and sheets printed in color, and the numbers of sides and sheets printed in black and white. It should be noted that when a plurality of types of paper are used in one job, the numbers of sides and sheets printed in color and the numbers of sides and sheets printed in black and white are included in the job history information as separate information for each type of paper used. For example, the following describes a case in which a print job is executed that prints in color using one sheet of A4 size paper loaded in the paper feed tray 213 and one sheet of A3 size paper loaded in the paper feed tray 216. In this case, "1" is recorded as the number of sheets printed in color on A4 size paper loaded in the paper feed tray 213, and "1" is recorded as the number of sheets printed in color on A3 size paper loaded in the paper feed tray 216.

Figure 7A:
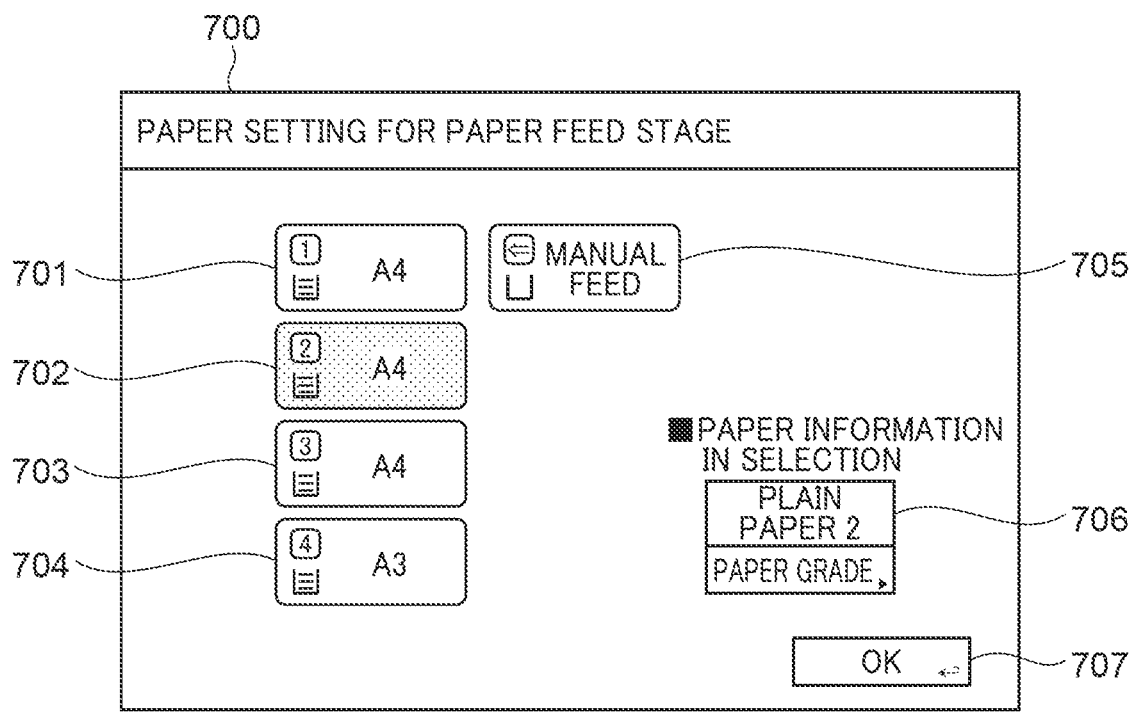
FIGS. 7A to 7D are diagrams showing examples of the screen displayed on the operation unit in FIG. 2.

FIGS. 7A to 7D are diagrams showing examples of screens displayed on the operation unit 206 in FIG. 2. FIG. 7A is a diagram showing an example of the paper setting screen 700 displayed on the operation unit 206. The paper setting screen 700 is displayed when the user selects the paper setting item for the paper feed unit on the user mode setting screen (not shown), which is displayed by pressing the setting key (not shown) on the operation unit 206.

The paper setting screen 700 is a screen that allows the user to select the paper feed unit for which paper information is to be set. The paper setting screen 700 includes paper feed unit designation buttons 701 to 705, a paper grade button 706, and an OK button 707. The paper feed unit designation buttons 701 to 704 correspond to paper feed trays 213 to 216, respectively. The paper feed unit designation buttons 701 to 704 each displays the paper size set for the corresponding paper feed unit and the remaining amount of paper stored in the corresponding paper feed unit. The paper feed unit designation button 705 corresponds to the manual feed tray 212. When paper is loaded in the manual feed tray 212, the paper size and remaining amount of paper loaded in the manual feed tray 212 are displayed on the paper feed unit designation button 705. On the other hand, when no paper is loaded in the manual feed tray 212, neither the paper size nor the amount of paper remaining is displayed on the paper feed unit designation button 705.

When the user presses one of the buttons from the paper feed unit designation button 701 to paper feed unit designation button 705 on the paper setting screen 700, for example, presses the paper feed unit designation button 702 as shown in FIG. 7A, the paper feed tray 214 corresponding to the paper feed unit designation button 702 is selected. In this case, the paper grade button 706 displays the paper name set for the paper feed tray 214 that has been selected. In a case where the user presses the paper grade button 706, the screen on the operation unit 206 transitions to a paper grade management screen 714 in FIG. 7C, described below. In a case where the user presses the OK button 707, the paper grade ID corresponding to the information selected on the paper grade management screen 714 described below is recorded as the paper grade ID corresponding to the paper feed tray 214 in the paper feed stage information table 400 on the RAM 202. It should be noted that in the present embodiment, for the paper size setting for each paper feed unit, the configuration is described in which the paper size is set as measured by the size detection device included in the printer engine 211, but the present invention is not limited to this configuration. For example, the printer engine 211 may not have a size detection function, and the paper size setting for the paper feed unit may be made using the paper size entered by the user on the setting screen displayed on the operation unit 206.

Figure 7B:
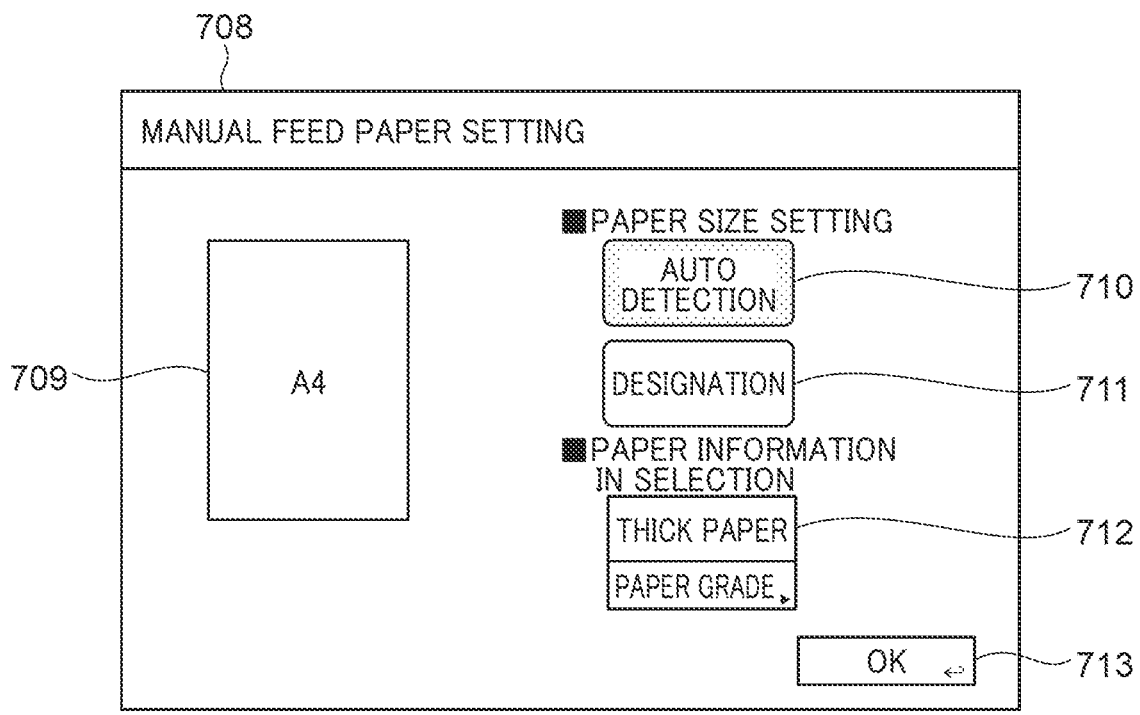

FIG. 7B is a diagram showing an example of the manual feed paper setting screen 708 displayed on the operation unit 206. The manual feed paper setting screen 708 is displayed on the operation unit 206 when the printer engine 211 detects that paper is loaded in the manual feed tray 212. The manual feed paper setting screen 708 includes a paper size display area 709, an auto-detect button 710, a paper size designation button 711, a paper grade button 712, and an OK button 713.

The paper size display area 709 is an area which displays the paper size of the paper loaded in the manual feed tray 212. The paper size display area 709 displays the paper size set by the method corresponding to the button selected by the user among the auto-detect button 710 and the paper size designation button 711. For example, in a case where the user selects the auto-detect button 710, the paper size of the paper loaded in the manual feed tray 212 is measured by the paper size detection function included in the printer engine 211, and this measured (detected) paper size is displayed in the paper size display area 709. On the other hand, in a case where the user selects the paper size designation button 711, the paper size entered by the user on the paper size setting screen (not shown) displayed on the operation unit 206 is displayed in the paper size display area 709. The paper grade button 712 is for setting the paper grade information for the paper loaded in the manual feed tray 212. When the user presses the paper grade button 712, the screen on the operation unit 206 transitions to the paper grade management screen 714 in FIG. 7C. When the user presses the OK button 713, the paper size and paper grade information thus set are recorded in the paper feed stage information table 400 on the RAM 202 as the paper size and paper grade information for the manual feed tray 212.

Figure 7C:
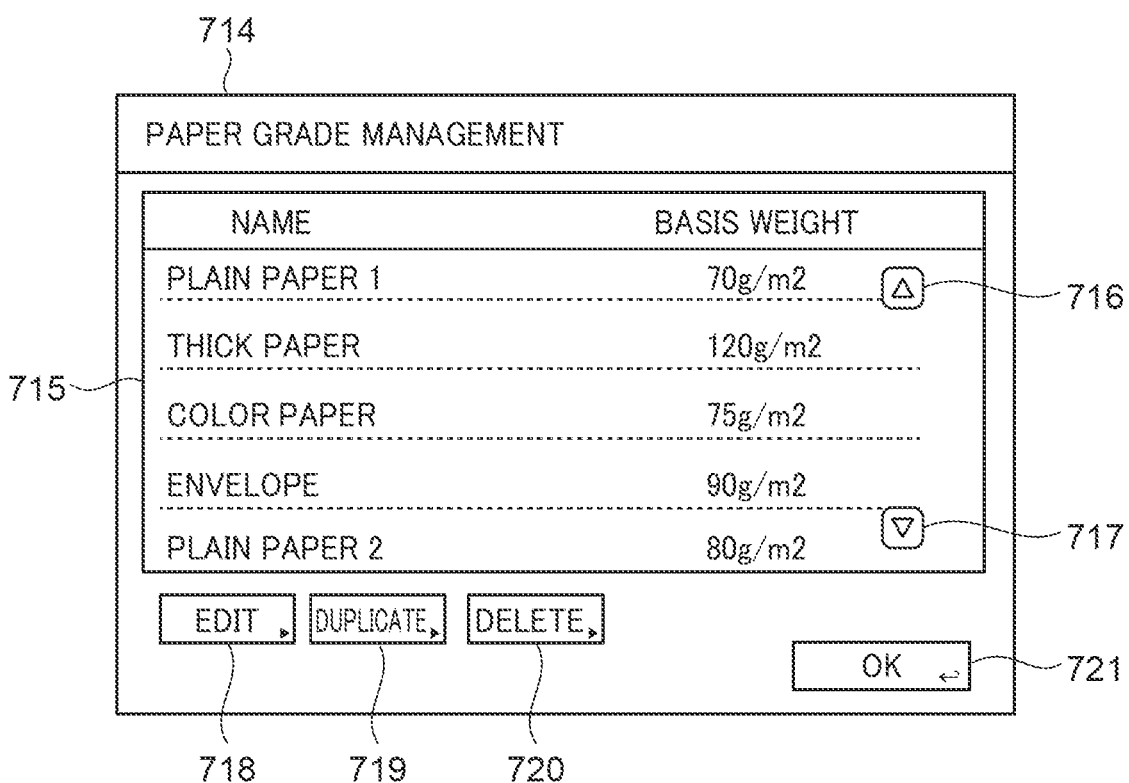

FIG. 7C is a diagram showing an example of the paper grade management screen 714 displayed on the operation unit 206. The paper grade management screen 714 is displayed when the user presses the paper grade button 706 on the paper setting screen 700 or the paper grade button 712 on the manual feed paper setting screen 708. The paper grade management screen 714 includes a paper grade display unit 715, a list scroll button 716, a list scroll button 717, an edit button 718, a duplicate button 719, a delete button 720, and an OK button 721. The paper grade display unit 715 displays a list of the paper grade information recorded in the paper grade table 500. In FIG. 7C, as an example, the paper name and basis weight, which are part of the paper grade information, are listed. The list scroll button 716 and the list scroll button 717 are used to scroll the paper grade display unit 715.

The edit button 718 is for editing the paper grade information selected on the paper grade display unit 715. When the user presses the edit button 718 while any paper grade information is selected in the paper grade display unit 715, the screen on the operation unit 206 transitions to the paper grade setting screen 722 in FIG. 7D, described below. The duplicate button 719 is for duplicating the paper grade information selected in the paper grade display unit 715. When the user presses the duplicate button 719, information equivalent to the paper grade information selected on the paper grade display unit 715 is duplicated in the paper grade table 500. The delete button 720 is for deleting the paper grade information selected in the paper grade display unit 715 from the paper grade table 500. When the user presses the delete button 720, the selected paper grade information is deleted from the paper grade table 500. It should be noted that the edit button 718, duplicate button 719, and delete button 720 can be pressed only when any of the paper grade information is selected in the paper grade display unit 715. The OK button 721 is for reflecting the editing, duplication, or deletion of paper grade information made on the paper grade management screen 714.

Figure 7D:
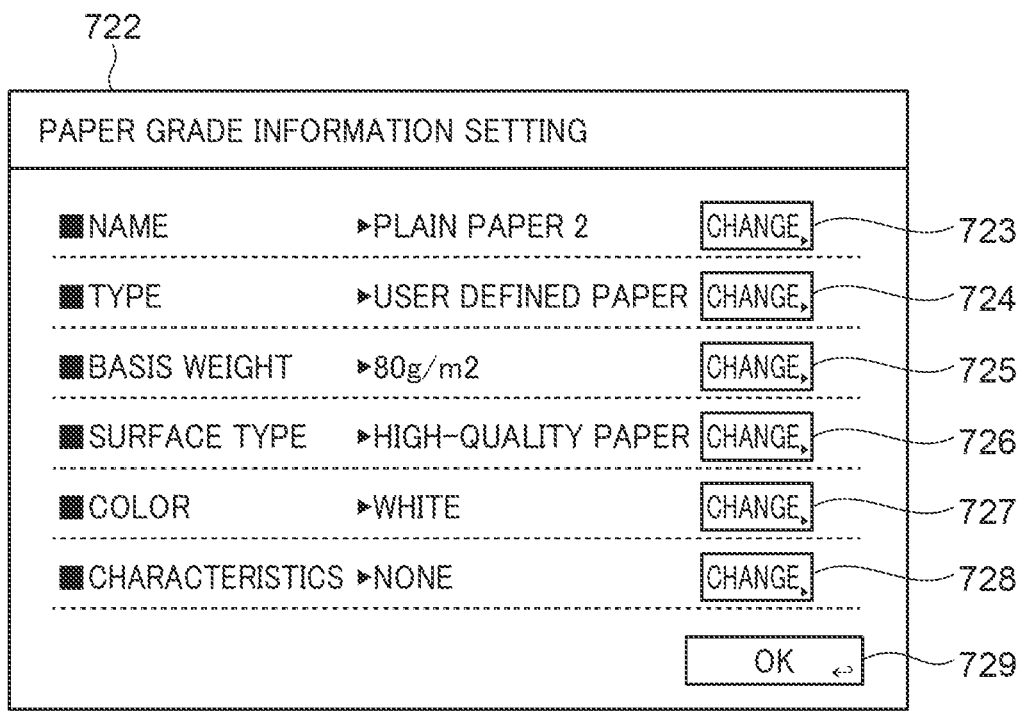

FIG. 7D is a diagram showing an example of the paper grade setting screen 722 displayed on the operation unit 206. The paper grade setting screen 722 is displayed when the user presses the edit button 718 on the paper grade management screen 714. The paper grade setting screen 722 includes change buttons 723 to 728 and an OK button 729.

The change buttons 723 to 728 are for changing each item of paper grade information selected on the paper grade management screen 714, specifically, paper name, paper type, basis weight, paper surface type, paper color, and paper characteristics, respectively. For example, in a case where the user presses the change button 723, the screen on the operation unit 206 transitions to a paper name change screen (not shown) to change the paper name. The paper name entered on this paper name change screen is temporarily stored in the RAM 202. The OK button 729 is for reflecting the changes made. When the user presses the OK button 729, in the paper grade table 500, the paper grade information selected in the paper grade display unit 715 is updated to the value temporarily stored in the RAM 202, and the screen of the operation unit 206 transitions to the paper grade management screen 714.

Next, the flow of the processing whereby the image forming apparatus 101 resumes the job that was once interrupted and transmits the job execution log to the aggregation server 104 is described using FIGS. 8A and 8B.

FIG. 8A illustrates, as an example, a case where a print job to print on a plurality of types of paper is started, the print job is interrupted because a certain type of paper to be used for printing has not been loaded, and the print job is resumed after the paper is loaded. It should be noted that FIG. 8A describes, as an example, a case where printing is to be made on A4 size paper and A3 size paper in this order.

Referring to FIG. 8A, the image forming apparatus 101 starts the above-mentioned print job that has been instructed to be executed by the user (step S801). When the print job is started, the job management unit 305 transmits a job status notification indicating the start of the job to the transmission data generation unit 310. Upon receiving this job status notification, the transmission data generation unit 310 starts the job execution log generation processing. In the job execution log generation processing, the transmission data generation unit 310 acquires the paper information of each paper feed unit at the start of the print job and acquires the paper grade information corresponding to the paper grade ID included in the acquired paper information from the paper grade table 500, respectively. At this time, the transmission data generation unit 310 records the paper feed stages for which paper information could not be acquired into the unacquired paper feed unit list stored in advance in the ROM 203 or HDD 204. For example, in a case where paper information for the paper feed stages 1 to 3 is acquired from the paper feed stage information table 400, the transmission data generation unit 310 acquires the paper grade information corresponding to paper grades IDs "00000100", "00010101", and "00010103" from the paper grade table 500, respectively. At this time, the paper feed stage 4 and manual feed tray for which paper information could not be acquired are recorded into the unacquired paper feed unit list.

Next, the job management unit 305 continues execution of the print job (step S802) and transmits a job status notification indicating that the job is being executed to the transmission data generation unit 310. The transmission data generation unit 310 that receives this job status notification does not execute processing. In executing the print job, the image forming apparatus 101, for example, supplies A4 size paper from the paper feed tray 213 corresponding to the paper feed stage 1 and prints on this paper. Next, at the time when intending to start to print in A3 size, the printer engine 211 detects that no A3 size paper is loaded in any of the paper feed units and notifies the job management unit 305 of this fact. Upon receiving this notification, the job management unit 305 executes the print job interruption processing (step S803) and transmits a job status notification indicating the interruption of the job to the transmission data generation unit 310. At this time, the job management unit 305 may display on the operation unit 206 that absence of A3 size paper has occurred via the operation control unit 303. For example, assume that the user loads A3 size paper in the paper feed tray 216, where no paper is loaded, and sets the paper information corresponding to this loaded paper in association with the paper feed tray 216. When detecting that paper has been set and paper information has been set, the job management unit 305 resumes the print job (step S804) and transmits a job status notification to the transmission data generation unit 310 indicating that the job has been resumed. Upon receiving this job status notification, the transmission data generation unit 310 acquires, from the unacquired paper feed unit list, the paper information for the paper feed tray 216 to which the user loaded paper during the interruption of the print job, and acquires the paper grade information corresponding to the paper grade ID included in the acquired paper information.

Then, when the print job execution is completed (step S805), the job management unit 305 transmits a job status notification indicating the job end (completion) to the transmission data generation unit 310. Upon receiving this job status notification, the transmission data generation unit 310 acquires the history information of the print job that has been completed its execution from the job history management unit 311. The transmission data generation unit 310 generates a job execution log based on the acquired print job history information and the paper attribute information of the paper feed stage 4 acquired when the print job is resumed. The paper attribute information includes paper information and paper grade information. This job execution log includes history information indicating the execution results of the print job, paper attribute information for the paper feed tray 213 that supplied A4 size paper, and paper attribute information for the paper feed tray 216 that supplied A3 size paper. Next, the image forming apparatus 101 transmits the generated job execution log to the aggregation server 104 (step S806) and terminates the processing.

FIG. 8B illustrates, as an example, a case where a print job is started to print on paper supplied from the manual feed tray 212, the print job is interrupted because no paper is loaded in the manual feed tray 212, and the print job is resumed after the paper is loaded into the manual feed tray 212. FIG. 8B illustrates, as an example, the case of printing on five sheets of B4 size paper.

Referring to FIG. 8B, the image forming apparatus 101 starts the above-mentioned print job that has been instructed to be executed by the user (step S811). When the print job is started, the job management unit 305 transmits a job status notification indicating the start of the job to the transmission data generation unit 310. Upon receiving this job status notification, the transmission data generation unit 310 starts the job execution log generation processing in the same manner as in FIG. 8A. In the processing, for example, in a case where paper information on the paper feed stages 1 to 3 is acquired from the paper feed stage information 400, the transmission data generation unit 310 acquires the paper grade information corresponding to the paper grade IDs included in the paper information from the paper grade table 500, respectively. At this time, the paper feed stage 4 and manual feed tray for which paper information could not be acquired are recorded into the unacquired paper feed unit list.

Next, the job management unit 305 instructs the printer engine 211 to print on paper supplied from the manual feed tray 212; however, the printer engine 211 detects that there is no paper in the manual feed tray 212 and notifies the job management unit 305 of this fact. Upon receiving this notification, the job management unit 305 executes the print job interruption processing (step S812) and transmits a job status notification indicating the interruption of the job to the transmission data generation unit 310. At this time, the job management unit 305 may display on the operation unit 206 that absence of paper in B4 size has occurred via the operation control unit 303. For example, assume that the user loads five sheets of B4 size paper in the manual feed tray 212 and sets the paper information corresponding to this paper in association with the manual feed tray 212. When detecting that paper is loaded in the manual feed tray 212 and that paper information has been set, the job management unit 305 resumes the print job (step S813) and transmits a job status notification indicating the resumption of the job to the transmission data generation unit 310. Upon receiving this job status notification, the transmission data generation unit 310 acquires from the unacquired paper feed unit list the paper information of the manual feed tray 212 to which the user loaded paper during the interruption of a print job, and acquires the paper grade information corresponding to the paper grade ID included in the acquired paper information.

Then, when the print job execution is completed (step S814), the job management unit 305 transmits a job status notification indicating the job end (completion) to the transmission data generation unit 310. At this time, no loaded paper remains in the manual feed tray 212. In the present embodiment, at the time when there is no more paper in the manual feed tray 212, the paper information setting for the manual feed tray 212 is cancelled and the paper information in the manual feed tray 212 enters an unset state. Upon receiving the above-mentioned job status notification, the transmission data generation unit 310 acquires from the job history management unit 311 the history information of the print job that has completed execution. The transmission data generation unit 310 generates a job execution log based on the acquired print job history information and the paper attribute information of the manual feed tray 212 acquired when the print job is resumed. This job execution log includes history information indicating the execution results of the print job and the paper attribute information of the manual feed tray 212 set when B4 size paper is loaded in the manual feed tray 212. Next, the image forming apparatus 101 transmits the generated job execution log to the aggregation server 104 (step S815) and terminates the processing.

In this manner, in the present embodiment, the job execution log including paper attribute information set during job interruption is transmitted to the aggregation server 104.

Figure 9:
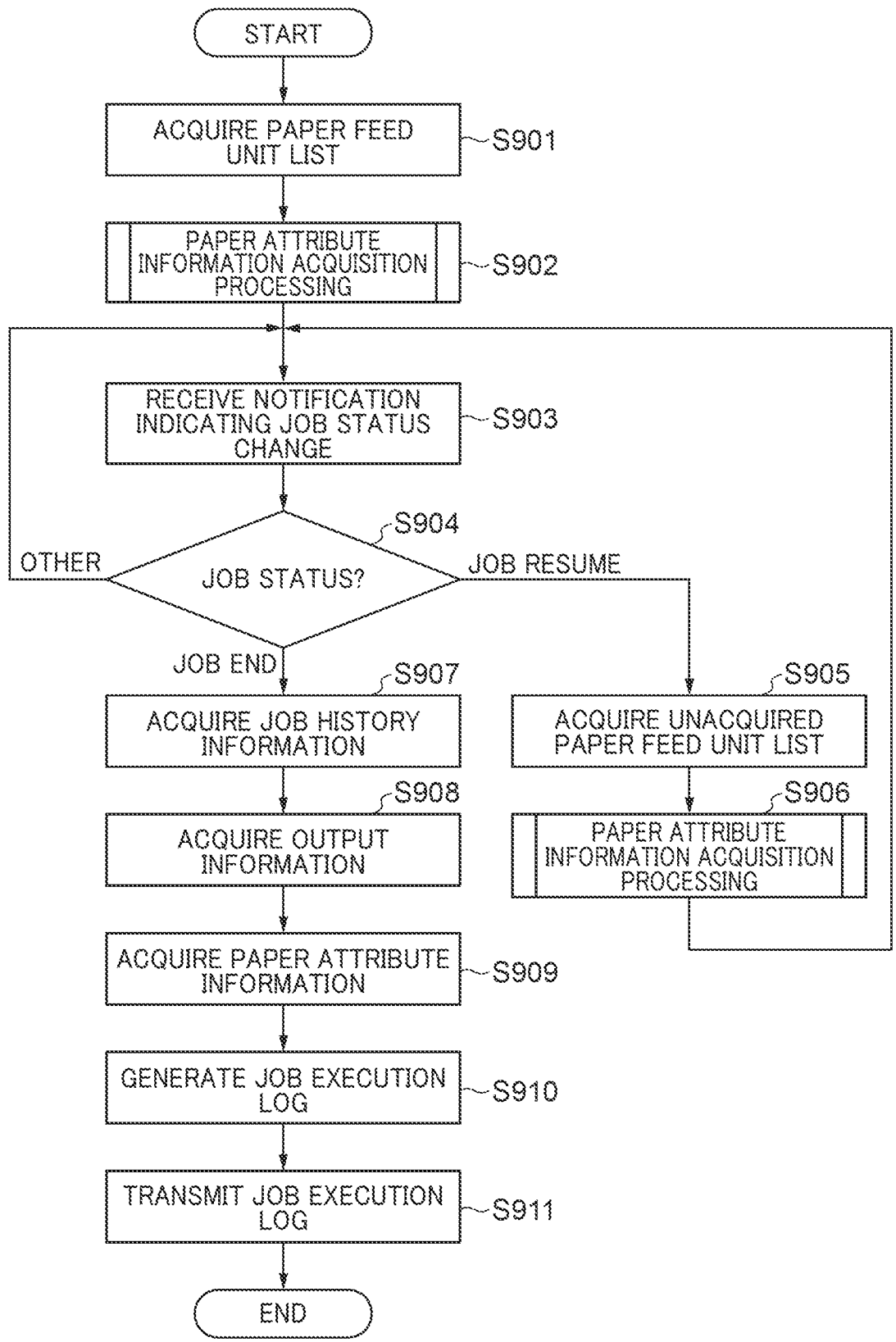
FIG. 9 is a flowchart showing the procedure of the job execution log generation processing executed by the transmission data generation unit in FIG. 3.

FIG. 9 is a flowchart showing the procedure of the job execution log generation processing executed by the transmission data generation unit 310 in FIG. 3. The job execution log generation processing in FIG. 9 is realized by CPU 201 executing a control program that is extracted from the ROM 203 to RAM 202. The job execution log generation processing in FIG. 9 is executed when the image forming apparatus 101 receives a print job, an execution instruction for a print job and the like, described above, from the user, and the transmission data generation unit 310 receives a job status notification indicating the start of the job.

In FIG. 9, the transmission data generation unit 310 acquires a paper feed unit list, which is a list information of paper feed units included in the printer engine 211, from the printer control unit 309 via the job management unit 305 (step S901), and stores the acquired paper feed unit list in the RAM 202. Next, the transmission data generation unit 310 executes the paper attribute information acquisition processing shown in FIG. 10 (step S902).

Figure 10:
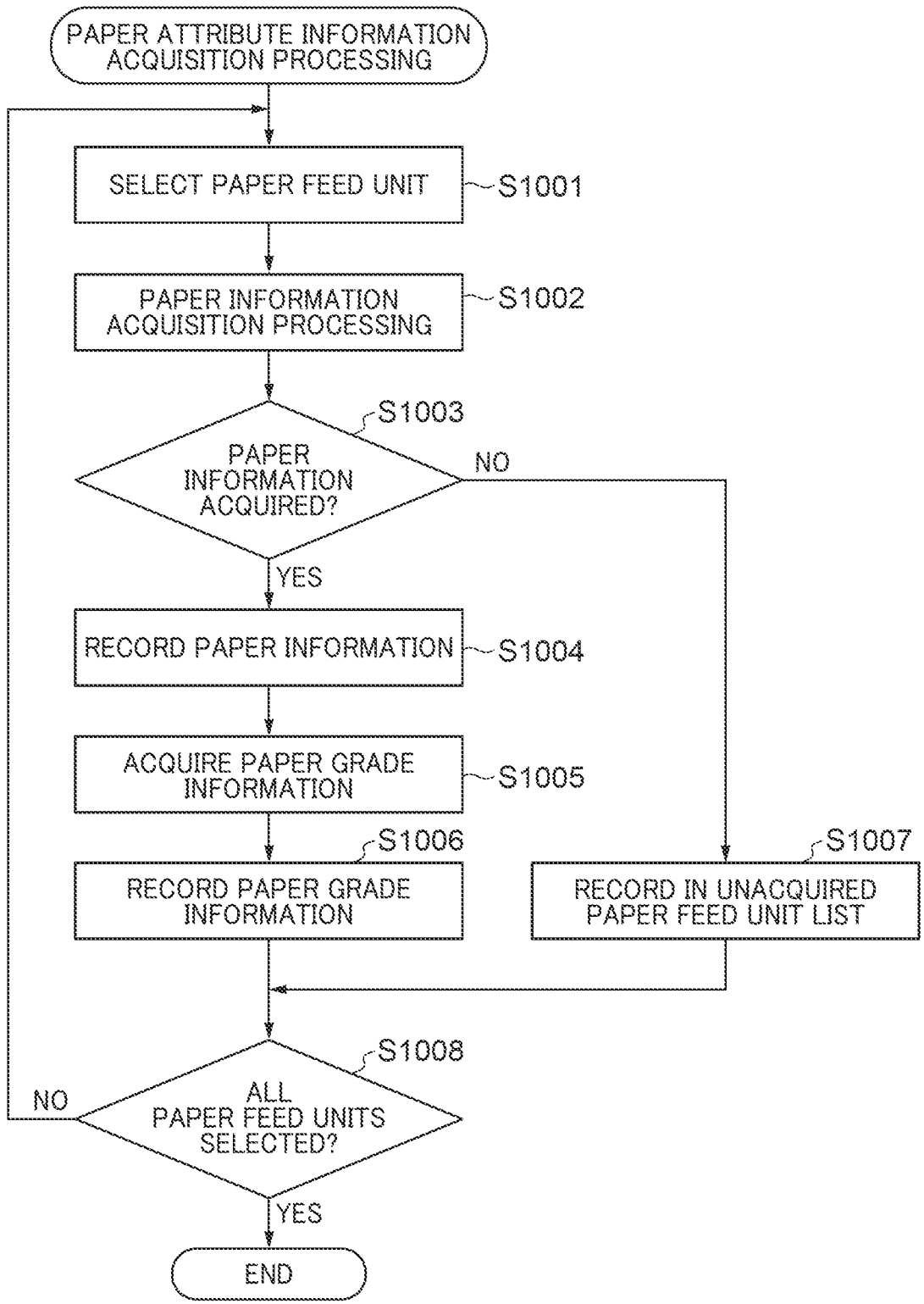
FIG. 10 shows a flowchart showing the paper attribute information acquisition processing in steps S902 and S906 in FIG. 9.

FIG. 10 is a flowchart showing the paper attribute information acquisition processing in the steps S902 and S906 in FIG. 9.

In FIG. 10, the transmission data generation unit 310 selects one paper feed unit from the acquired list, for example, the paper feed unit list (step S1001). Next, the transmission data generation unit 310 executes a processing to acquire the paper information set for the selected paper feed unit from the paper feed stage information table 400 (step S1002). The acquired paper information is held in the RAM 202. Next, the transmission data generation unit 310 determines whether or not the paper information for the selected paper feed unit has been acquired (step S1003).

As a result of the determination in the step S1003, in a case where the paper information of the selected paper feed unit is acquired, the transmission data generation unit 310 records the acquired paper information in the paper information list of the paper feed unit (step S1004). The paper information list of the paper feed unit is used to generate the job execution log described below and is held in the RAM 202. Next, the transmission data generation unit 310 acquires the paper grade ID from the paper information acquired in the step S1002. The transmission data generation unit 310 requests the paper grade information management unit 313 for the paper grade information corresponding to the paper grade ID via the job management unit 305, and acquires the paper grade information registered in the paper grade table 500 from the paper grade information management unit 313 (step S1005). Next, the transmission data generation unit 310 records the acquired paper grade information into the paper information list of the paper feed unit in association with the paper information recorded in the step S1004 (step S1006). Next, the paper attribute information acquisition processing proceeds to a step S1008 described below.

As a result of the determination in step S1003, in a case where the paper information for the selected paper feed unit could not be acquired, the transmission data generation unit 310 records the paper feed unit selected in the step S1002 into the unacquired paper feed unit list (step S1007). Next, the transmission data generation unit 310 determines whether all paper feed units in the acquired list have been selected by the step S1001 (step S1008).

As a result of the determination in the step S1008, in a case where any of the paper feed units in the acquired list has not been selected by the step S1001, the paper attribute information acquisition processing returns to the step S1001. The transmission data generation unit 310 selects one paper feed unit from the unselected paper feed units in the acquired list and executes the step S1002 and subsequent processing. As a result of the determination in the step S1008, in a case where all paper feed units in the acquired list were selected by the step S1001, the paper attribute information acquisition processing ends and processing proceeds to a step S903 in FIG. 9.

Returning to FIG. 9, the transmission data generation unit 310 stands by until it receives a notification from the job management unit 305 indicating a job status change, specifically, a job status notification indicating other than job start. Upon receiving a job status notification indicating other than job start from the job management unit 305 (step S903), the transmission data generation unit 310 determines the status of the job indicated by the received job status notification (step S904). Specifically, the transmission data generation unit 310 determines whether the received job status notification indicates job end, job resumption, or something else (hereinafter referred to as "other"). The case where the received job status notification indicates the end of a job corresponds to, for example, a case where the job is completed, where the user intentionally terminates the execution of the job, or where an error occurs in any processing of the job and the job is terminated. The case where the received job status notification indicates the resumption of a job corresponds to, for example, a case where the job is interrupted because paper is not loaded in the specified paper feeder (paper feed unit/paper feed stage), and then the job is resumed after paper is loaded in the specified paper feeder.

In a case where the result of the determination in the step S904 indicates that the received job status notification is other, the job execution log generation processing returns to the processing of the step S903.

As a result of the determination in the step S904, in a case where the received job status notification indicates that the job is resumed, the transmission data generation unit 310 acquires the unacquired paper feed unit list (step S905). The unacquired paper feed unit list records at least the paper feed unit that caused the job to be interrupted, i.e., the paper feed unit in which no paper was loaded at the start of the job. Next, the transmission data generation unit 310 executes the paper attribute information acquisition processing shown in FIG. 10 (step S906), selects one paper feed unit from the unacquired paper feed unit list in the step S1001, and executes the step S1002 and subsequent processing. By the processing of the step S905, when a job is resumed after paper is loaded in a paper feed unit in which no paper was loaded at the start of the job, the paper attribute information set for the paper feed unit at the time the job is resumed is recorded in the paper information list of the paper feed unit. The job execution log generation processing then returns to the processing of the step S903.

As a result of the determination in the step S904, in a case where the received job status notification indicates that the end of the job, the transmission data generation unit 310 acquires from the job management unit 305 the history information of the job that has ended execution (step S907) (history information acquisition unit). The transmission data generation unit 310 temporarily stores the acquired job history information in the RAM 202. Next, the transmission data generation unit 310 acquires output information from the above job history information (step S908), and temporarily stores the output information in the RAM 202. The output information includes information that identifies the paper feed unit that supplied paper in the job, and also includes information that identifies the paper feed unit that supplied paper after the job resumes. In a case where the above output information includes information on a plurality of the paper feed units, the transmission data generation unit 310 reads out the information on all of the paper feed units and temporarily stores it in the RAM 202. Next, the transmission data generation unit 310 acquires the paper attribute information corresponding to the paper feed unit identified from the output information acquired in the step S908 from among the paper information list of the paper feed unit (step S909). In a case where the output information acquired in the step S908 includes information on the plurality of paper feed units, the transmission data generation unit 310 acquires paper attribute information corresponding to all the plurality of paper feed units. The transmission data generation unit 310 holds the acquired paper attribute information in the RAM 202.

Next, the transmission data generation unit 310 generates the job execution log 1100 shown in FIG. 11 based on the job history information and the paper attribute information acquired in the step S909 (step S910), and records the job execution log 1100 in the HDD 204. Next, the transmission data generation unit 310 transmits the job execution log 1100 to the aggregation server 104 (step S911), and the job execution log generation processing ends.

The processing in FIG. 9 describes a configuration in which the generated job execution log 1100 is immediately transmitted to the aggregation server 104, but the preset invention is not limited to this configuration. For example, the job execution log 1100 may be temporarily held in the HDD 204 and transmitted to the aggregation server 104 together with the job execution logs of other jobs.

FIG. 11 is a diagram showing an example of a job execution log 1100 generated by the transmission data generation unit 310 in FIG. 3. The job execution log 1100 is data in JSON format which is a single file output as a single log. The job execution log 1100 includes basic information 1101, print setting information 1102, output information 1103, and paper attribute information 1104. The value of the basic information in the job history information is set in the basic information 1101, and the value of the print setting information in the job history information is set in the print setting information 1102. The output information 1103 includes the paper attribute, page attribute, and output-Paper attribute. As information on the paper attribute, for example, the total number of output sheets in the job history information is set. As information on the page attribute, for example, the number of pages in the job history information is set. As information on the output-Paper attribute, the number of color sheets in the paper feed unit and the number of monochrome sheets in the paper feed unit are set. In a case where information on the plurality of paper feed units is set in the output-Paper attribute, information on other paper feed units is added starting from the line following the last line of information on one paper feed unit. The value of the paper attribute information acquired in the step S909 is set in the paper attribute information 1104. For example, the paper information acquired from the paper feed stage information 400 is set as the information of the size attribute in the paper attribute information 1104. In addition, the paper grade information acquired from the paper grade table 500 is set as the information of and after the type attribute. Likewise in the paper attribute information 1104, when information on the plurality of paper feed units is set, information on other paper feed units is added starting from the line following the last line of information on one paper feed unit.

According to the above-described embodiment, the processing of the step S902 to acquire paper attribute information is executed at the start of a print job, and in a case where the job status notification indicates that the job is resumed, the processing of the step S906 to acquire paper attribute information set in the paper feed unit is further executed when the print job is resumed. This allows the paper attribute information set during the interruption of a print job to be transmitted to the aggregation server 104.

In addition, in the above-described embodiment, in a case where the job status notification indicates the resumption of the job, the paper attribute information, which is set at the time of resumption of the print job to the paper feed unit of which paper attribute information could not acquire at the time of the start of the print job, is acquired. This allows paper attribute information that is not set at the start of a print job and is set when the print job is resumed to be sent to the aggregation server 104.

In the above-described embodiment, an unacquired paper feed unit list is generated, which is a list information of paper feed units for which paper attribute information could not be acquired at the start of a print job among the paper feed units. This reduces the load on the processing of identifying the paper feed unit to be subjected to the step S906, compared to the case where a paper feed unit list, which is a list information of paper feed units included in the printer engine 211, is used.

In the above-described embodiment, the plurality of paper feed units include the paper feed trays 213 to 216, and paper attribute information set for the paper feed trays 213 to 216 during the interruption of the print job therefore can be transmitted.

In the embodiment described above, the plurality of paper feed units include the manual feed tray 212, which the paper attribute information setting therefor is cancelled when there is no more paper loaded thereon. This allows the paper attribute information set in the manual feed tray 212 to be acquired before the setting is canceled, thus allowing the paper attribute information set for the manual feed tray 212 during the interruption of the print job to be transmitted.

The present invention was described using the above-described embodiments; however, the invention is not limited to the embodiments. For example, the job execution log 1100 may be tabular data with one row per job execution log, rather than data in JSON format with one file output as one log.

In the above-described embodiment, the paper attribute information of the paper feed stage, which may be in an image forming apparatus without a manual feed tray, may be acquired at the completion of a print job, instead of at the start of the print job.

In the above-described embodiment, copying is used as an example of the function executing a job; however, the present invention is not limited to this. For example, the present invention may be applied to printing based on a print request received from communication apparatus 103 or printing by fax reception.

Although in the above-mentioned embodiments, FIGS. 8A and 8B are shown as examples of cases in which paper attribute information is set during job interruption, the present invention is not limited to these cases. For example, the paper attribute information may be changed during job interruption to paper attribute information that is different from that at the start of the job.

Figure 12:
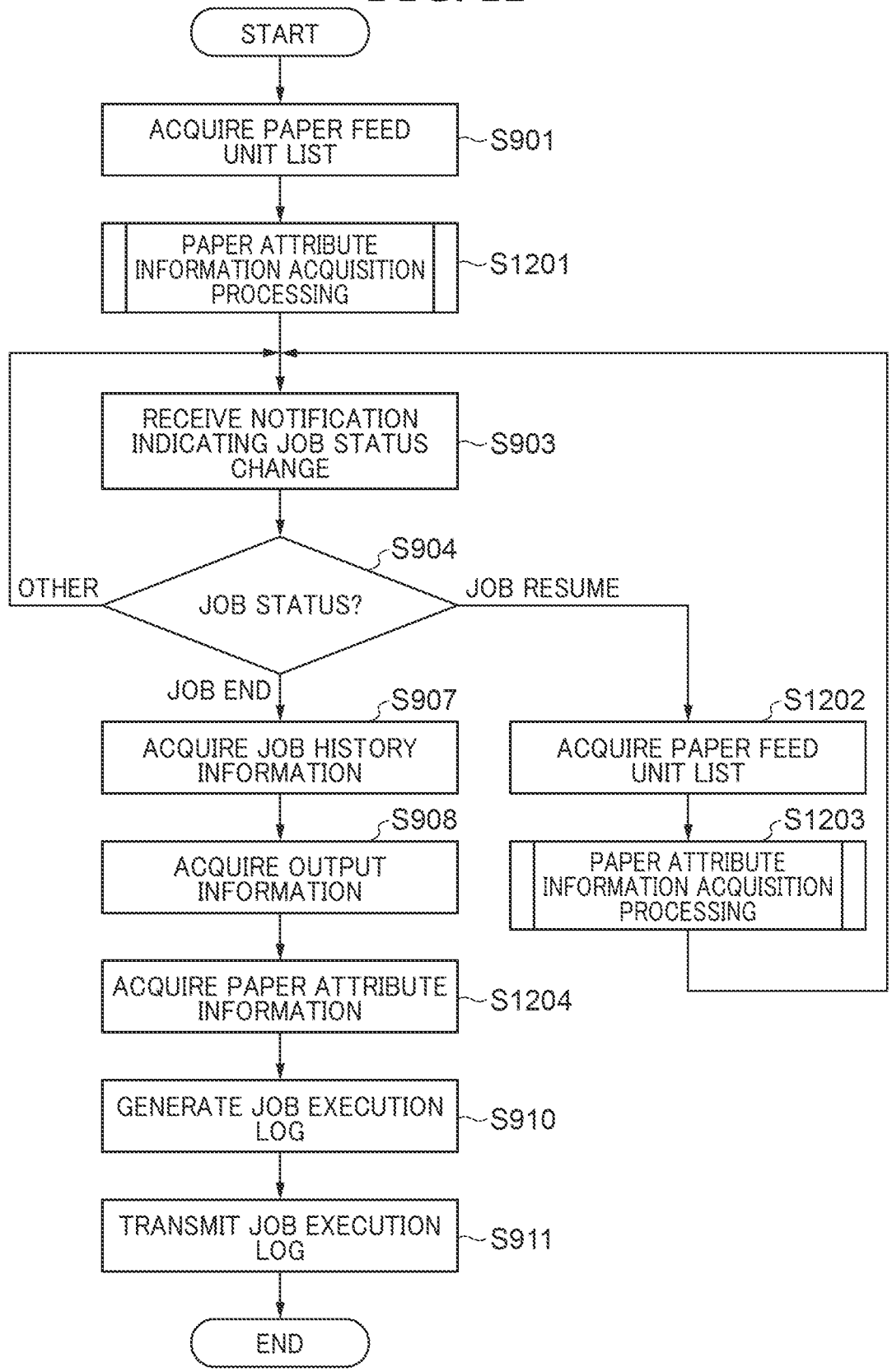
FIG. 12 is a flowchart showing another procedure in the job execution log generation processing executed by the transmission data generation unit in FIG. 3.

FIG. 12 is a flowchart showing another procedure of the job execution log generation processing executed by the transmission data generation unit 310 in FIG. 3. The job execution log generation processing in FIG. 12 is basically the same as the job execution log generation processing in FIG. 9. In the following, the same step numbers as in the job execution log generation processing in FIG. 9 are given for the same processing as in FIG. 9, and only processing different from the job execution log generation processing in FIG. 9 is described. The job execution log generation processing in FIG. 12 is also realized by CPU 201 executing a control program that is extracted from the ROM 203 to the RAM 202. The job execution log generation processing in FIG. 12 is also executed when the image forming apparatus 101 receives a print job, an execution instruction for a print job and the like, as described above, from the user, and the transmission data generation unit 310 receives a job status notification indicating the start of the job.

In FIG. 12, the processing of the step S901 is executed first. Next, the transmission data generation unit 310 executes the paper attribute information acquisition processing shown in FIG. 13 (step S1201).

Figure 13:
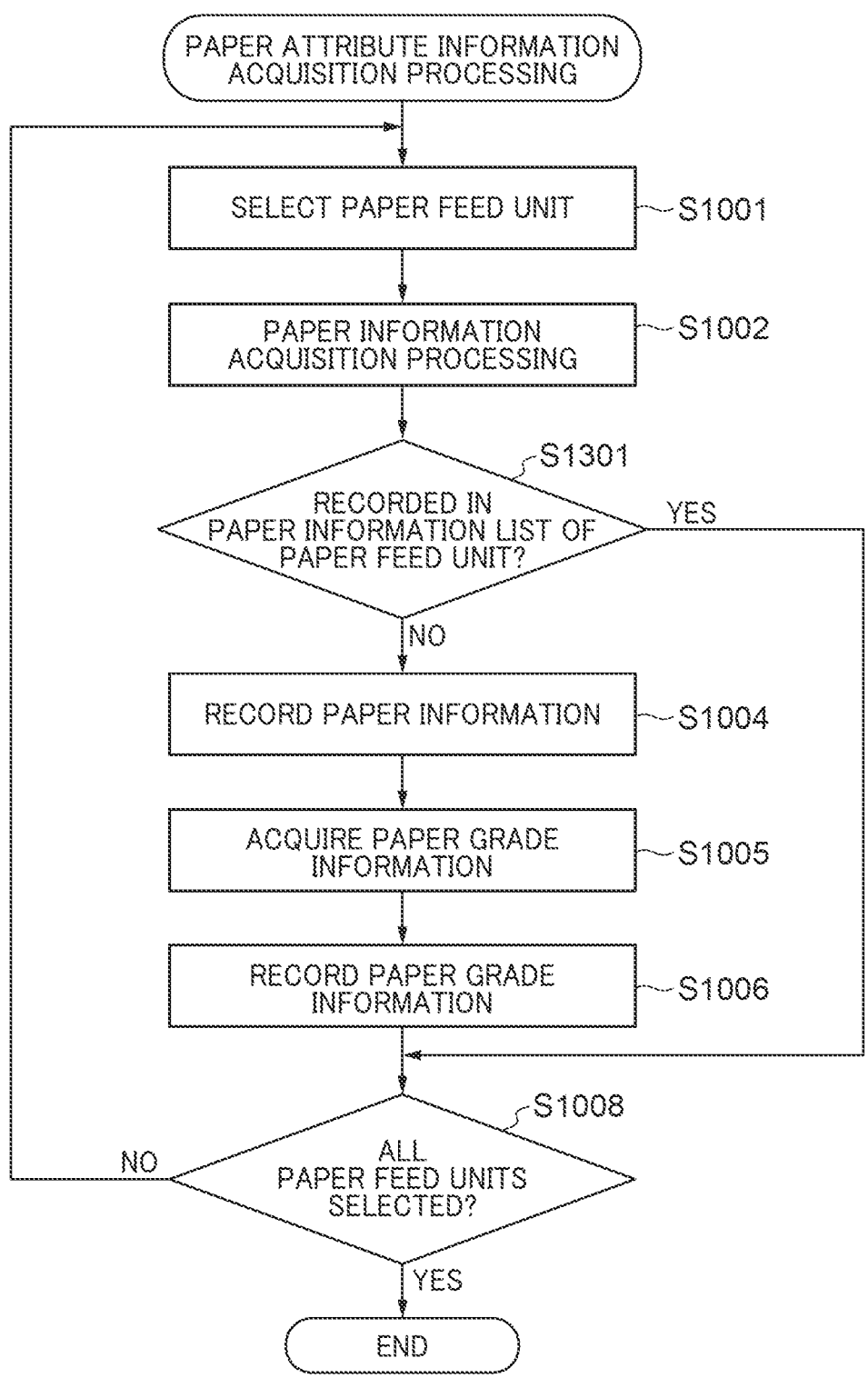
FIG. 13 is a flowchart showing the paper attribute information acquisition processing in steps S1201 and S1203 in FIG. 12.

FIG. 13 shows a flowchart showing the paper attribute information acquisition processing in steps S1201 and S1203 in FIG. 12. The paper attribute information acquisition processing in FIG. 13 is basically the same as the paper attribute information acquisition processing in FIG. 10. In the following, the same step numbers as in the paper attribute information acquisition processing in FIG. 10 are given for the same processing as in FIG. 10, and only processing different from the paper attribute information acquisition processing in FIG. 10 is described.

In FIG. 13, the transmission data generation unit 310 executes the processing of the steps S1001 and S1002. Next, the transmission data generation unit 310 determines whether the paper information acquired in the step S1002 is recorded in the paper information list of the paper feed unit (step S1301). For example, in a case where information that matches in all of the paper feed unit, the paper size, and the paper grade ID included in the acquired paper information is recorded in the paper information list of the paper feed unit, the transmission data generation unit 310 determines that the acquired paper information is recorded in the paper information list of the paper feed unit. On the other hand, in a case where information matching in all of the paper feed unit, paper size, and paper grade ID included in the acquired paper information is not recorded in the paper information list of the paper feed unit, the transmission data generation unit 310 determines that the acquired paper information is not recorded in the paper information list of the paper feed unit.

As a result of the determination in the step S1301, in a case where the acquired paper information is recorded in the paper information list of the paper feed unit, the paper attribute information acquisition processing proceeds to the step S1008. As a result of the determination in the step S1301, in a case where the acquired paper information is not recorded in the paper information list of the paper feed unit, the paper attribute information acquisition processing proceeds to the step S1004. Next, the processes of the steps S1005, S1006, and S1008 are executed. As a result of the determination in the step S1008, in a case where all paper feed units in the acquired list were selected in the step S1001, the paper attribute information acquisition processing ends and processing proceeds to the step S903 in FIG. 12.

Returning to FIG. 12, the transmission data generation unit 310 executes processing of the steps S903 and S904. As a result of the determination in the step S904, in a case where the received job status notification indicates that the job is resumed, the transmission data generation unit 310 acquires the paper feed unit list as in the step S901 (step S1202). Next, the transmission data generation unit 310 executes the paper attribute information acquisition processing shown in FIG. 13 (step S1203), selects one paper feed unit from the paper feed unit list in the step S1001, and executes the step S1002 and subsequent processing. By the processing of the step S1203, in a case where the paper attribute information set for the paper feed stage, which is the paper feeder, is changed during job interruption, the changed paper attribute information is recorded in the paper information list of the paper feed unit as the paper attribute information of the relevant paper feed stage. The job execution log generation processing then returns to the processing of the step S903.

As a result of the determination in the step S904, in a case where the received job status notification indicates the end of the job, the transmission data generation unit 310 executes processing of the steps S907 and S908. Next, the transmission data generation unit 310 acquires the paper attribute information corresponding to the paper feed unit recorded in the output information acquired in the step S908 from among the paper information list of the paper feed unit (step S1204). The transmission data generation unit 310 holds the acquired paper attribute information in the RAM 202. Next, the job execution log generation processing proceeds to the step S910.

FIG. 14 is a diagram showing an example of a record of the paper information list of the paper feed unit in the present embodiment. The paper information list of the paper feed unit records the name of the paper feed stage (item "paper feed unit"), paper size, paper name, and paper grade ID. It should be noted that the paper information list of the paper feed unit is not limited to this configuration, and may include other items. Paper information is added to the paper information list of the paper feed unit by the paper attribute information acquisition processing described above being executed. For example, the following is a case where a job is started with paper information already set for the paper feed stages 1 to 4, and when the job is resumed, the paper size and paper grade for the paper feed stage 2 is changed by the user and paper is loaded on the manual feed tray, and the job is resumed. In this case, the paper attribute information acquisition processing executed at the start of the job records the paper information for each of the paper feed stages 1 to 4 into the paper information list of the paper feed unit. Then, the paper information of the manual feed tray and the paper information of the paper feed stage 2 are added to the paper information list of the paper feed unit by the paper attribute information acquisition processing executed when the job is resumed. Thus, in a case where the paper size or paper grade information is changed, even for the same paper feed unit, they are recorded as a different information in the paper information list of the paper feed unit.

In the above-described embodiment, in a case where the job status notification indicates the resumption of the print job, other paper attribute information different from the paper attribute information acquired at the start of the print job is acquired. Other paper attribute information is paper information that has been changed by the user after the print job has started. This allows other paper attribute information that has been changed after the job has started to be sent.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-090243, filed May 28, 2021, which is hereby incorporated by reference wherein in its entirety.

What is claimed is:

1. An image forming apparatus communicable with a management server, the image forming apparatus comprising:
    an image forming device configured to form an image on a sheet;
    a plurality of sheet feeding trays each configured to store sheets to be supplied to the image forming device; and
    one or more controllers configured to:
        store paper attribute information in association with each of the plurality of sheet feeding trays;
        execute an image forming job that causes the image forming device to form a series of images using the sheets stored in at least one of the plurality of sheet feeding trays;
        acquire the attribute information of any of the plurality of sheet feeding trays;
        generate an execution log of the image forming job based on the acquired attribute information, and upon changing the attribute information corresponding to sheet feeding trays, among the plurality of sheet feeding trays, used during an execution of an image job, the generated execution log includes the attribution information before the change and the attribute information after the change;
        transmit the generated execution log to the management server; and
        generate a list information of all sheet feeding trays, among the plurality of sheet feeding trays, where the respective attribute information has not been acquired before changing the attribute information.

2. The image forming apparatus according to claim 1, wherein:
    the one or more controllers are further configured to receive a job status notification indicating the status of the image forming job,
    the one or more controllers acquire the attribute information:
        at the start of the image forming job; and
        in a state where the job status notification indicates resumption of the image forming job, at the resumption of the image forming job,
    the attribute information acquired at the start of the image forming job is the attribute information before the change, and
    the attribute information acquired at the resumption of the image forming job is the attribute information after the change.

3. The image forming apparatus according to claim 2, wherein, in a state where the job status notification indicates the resumption of the image forming job, the attribute information is set, at the time of resumption of the image forming job, to a sheet feeding tray, among the all sheet feeding trays, whose attribute information has not been acquired at the time of the start of the image forming job.

4. The image forming apparatus according to claim 1, wherein the execution log further includes history information indicating a result of the execution of the image forming job, which is acquired upon completing the image forming job.

5. The image forming apparatus according to claim 1, wherein the plurality of paper feeding trays include a manual feed tray, whose attribute information setting is canceled in a state where all sheets loaded thereon have been discharged.

6. The image forming apparatus according to claim 2, wherein, in a state where the job status notification indicates the resumption of the image forming job, the attribute information after the change, which is different from the attribute information acquired at the start of the image forming job is acquired.

7. The image forming apparatus according to claim 6, wherein the attribute information after the change has been changed by a user after starting the image forming job.

8. The image forming apparatus according to claim 1, wherein the one or more controllers transmit the generated execution log to the management server after the image forming job is executed.

9. A control method for an image forming apparatus communicable with a management server, and comprising an image forming device configured to form an image on a sheet and a plurality of sheet feeding trays each configure to store sheets to be supplied to the image forming device, the control method comprising:
    storing paper attribute information in association with each of the plurality of sheet feeding trays;
    executing an image forming job that causes the image forming device to form a series of images using the sheets stored in at least one of the plurality of sheet feeding trays;
    acquiring the attribute information of any of the plurality of sheet feeding trays;
    generating an execution log of the image forming job based on the acquired attribute information, and upon changing the attribute information corresponding to sheet feeding trays, among the plurality of sheet feeding trays, used during an execution of an image job, the generated execution log includes the attribution information before the change and the attribute information after the change;

transmitting the generated execution log to the management server; and generating a list information of all sheet feeding trays, among the plurality of sheet feeding trays, where the respective attribute information has not been acquired before changing the attribute information.

10. A computer-readable non-transitory storage medium storing a computer-executable program for executing a control method for an image forming apparatus communicable with a management server, and comprising an image forming device configured to form an image on a sheet and a plurality of sheet feeding trays each configured to store sheets to be supplied to the image forming device, the control method comprising:

storing paper attribute information in association with each of the plurality of sheet feeding trays;

executing an image forming job that causes the image forming device to form a series of images using the sheets stored in at least one of the plurality of sheet feeding trays;

acquiring the attribute information of any of the plurality of sheet feeding trays;

generating an execution log of the image forming job based on the acquired attribute information, and upon changing the attribute information corresponding to sheet feeding trays, among the plurality of sheet feeding trays, used during an execution of an image job, the generated execution log includes the attribution information before the change and the attribute information after the change;

transmitting the generated execution log to the management server; and generating a list information of all sheet feeding trays, among the plurality of sheet feeding trays, where the respective attribute information has not been acquired before changing the attribute information.

* * * * *